United States Patent [19]

Bednarczyk

[11] 4,146,988
[45] Apr. 3, 1979

[54] FISHING ROD TIP-UP

[76] Inventor: Edward J. Bednarczyk, 12 Riverview Pl., Yonkers, N.Y. 10701

[21] Appl. No.: 868,140

[22] Filed: Jan. 9, 1978

[51] Int. Cl.² ............................................. A01K 97/12
[52] U.S. Cl. ............................................................ 43/17
[58] Field of Search ..................................... 43/16, 17

[56] References Cited

U.S. PATENT DOCUMENTS

| 1,808,736 | 6/1931 | Hernke | 43/17 |
| 3,143,822 | 8/1964 | Schooley | 43/17 |
| 3,727,342 | 4/1973 | Lindsey | 43/17 |

FOREIGN PATENT DOCUMENTS 528074  9/1976  U.S.S.R. ........................................ 43/17

Primary Examiner—Robert C. Watson
Attorney, Agent, or Firm—Holland, Armstrong, Wilkie & Previto

[57] ABSTRACT

An improved fishing rod tip-up or strike indicator is disclosed which is removably attached to a fishing rod for indicating a strike while, at the same time, releasing the fishing line permitting it to run free. The tip-up has a clamp for removably attaching it to the fishing pole and has a partially rotating flag wire assembly supported by a pivot pin. As a fish strikes the bait, pulling on the fishing line, it causes the flag wire assembly to tilt to an upright strike indicating position. In this vertical position the fishing line will slip away from the holder allowing the line to run free.

5 Claims, 3 Drawing Figures

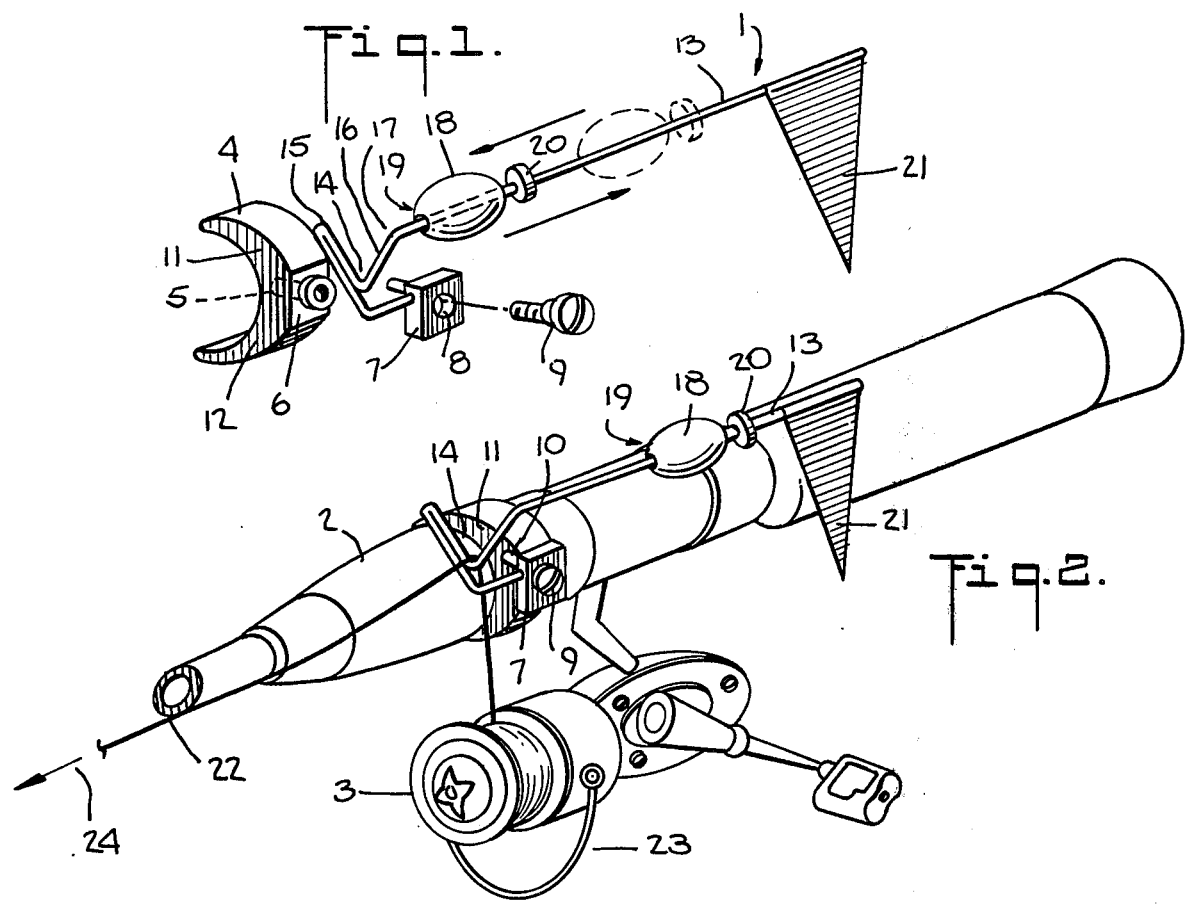
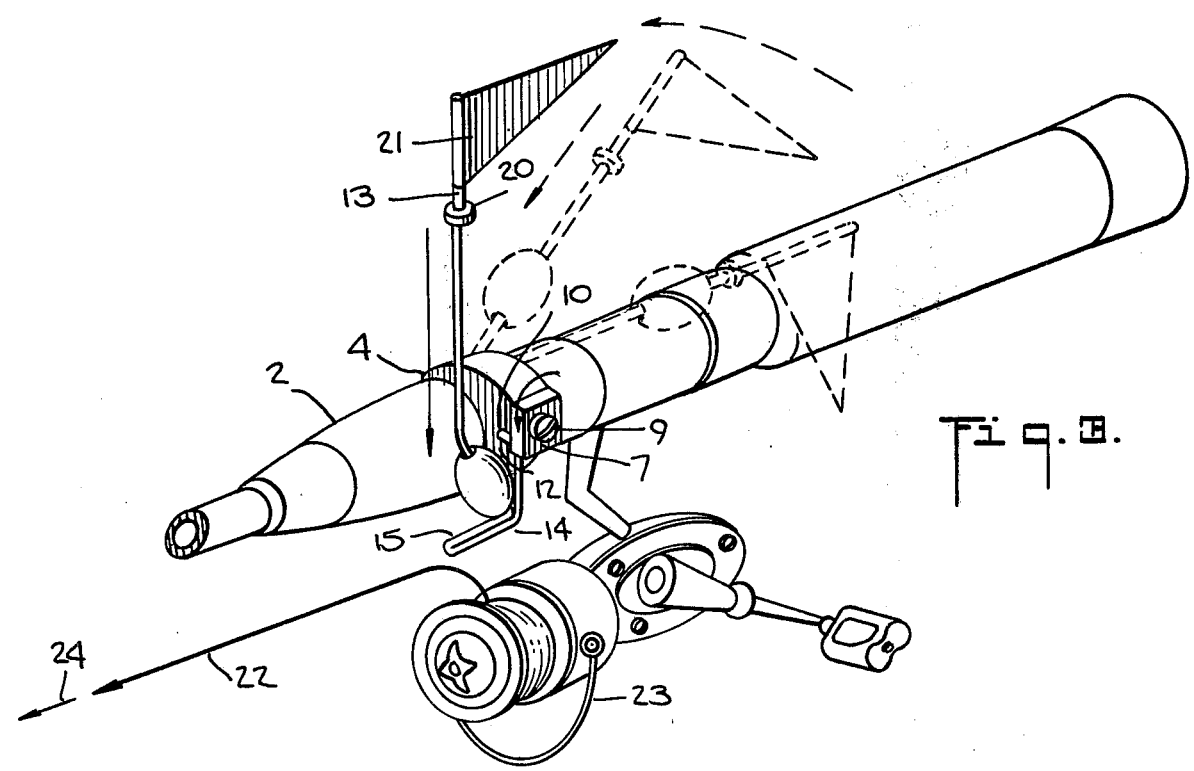

FISHING ROD TIP-UP

BACKGROUND AND SUMMARY OF THE INVENTION

The present invention covers improvements in fish tip-up devices and more particularly provides an improved tip-up which combines automatic fishing line control with a fish strike indication.

A variety of tip-up devices are already known which perform a strike indicating operation and certain tip-up devices are known which provide some measure of fish line control. The present invention provides a simplified and reliable device giving an immediate indication of a strike while simultaneously releasing the fishing line to a free running line condition thus giving the striking fish time to run and swallow the baited hook.

Accordingly, an object of the present invention is to provide an improved automatic fish tip-up and fish line control.

Another object of the present invention is to provide an improved and simplified fishing rod tip-up attachment which combines an indication of a strike with a simultaneous release of the fishing line.

Another object of the present invention is to provide an improved fishing rod tip-up device which permits the use of a free spool or open bail prior to the strike.

Another object of the present invention is to provide an improved fishing rod tip-up device which resists unintentional release by wind or water movements.

Another object of the present invention is to provide an improved fishing rod tip-up for visual signals.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention, not drawn to scale, has been chosen for purposes of illustration, assembly, and description and is shown in the accompanying drawing forming a part of the specification wherein:

FIG. 1. Is a partially exploded perspective view of a preferred embodiment of a fishing rod tip-up in accordance with the present invention.

FIG. 2. Is a perspective view corresponding to FIG. 1, of a fishing rod tip-up attached to a typical fishing pole and showing the tip-up in its cocked position.

FIG. 3. Is a perspective view corresponding to FIG. 2, showing the fish tip-up immediately after a fish has struck the bait, tilting the flag assembly, causing the sliding counter weight to slip and fall forward, beyond the fulcrum, resulting in the flag wiring assembly flipping to a vertical strike indicating position. As this occurs, the flag rises and the fishing line slips free.

DESCRIPTION OF THE PREFERRED EMBODIMENT

The fishing rod tip-up in accordance with the present invention is for use with spinning tackle and can be utilized in Spring, Summer, Winter and Fall. A preferred embodiment of the tip-up 1 is illustrated in the drawing detachably clipped onto the left side of fore grip of the fishing pole 2 directly above reel spool 3.

Tip-up 1 includes a flexible plastic clip 4 for detachably attaching it to the fishing pole 2. Plastic clip 4 has a threaded hole 5 for tip-up assembly with a raised collar 6 which acts as a spacer.

Tip-up includes a plastic square shaped disc 7 with a hole through the center 8 slightly larger in diameter than partially threaded pivot pin 9 which when assembled supports disc 7 to rod clip 4, but still allows disc 7 to turn free.

Disc 7 includes a stop peg 10. Its' function is to allow only a ¼ turn of disc 7. When tip-up 1 is in it's cocked horizontal position, stop peg 10 comes in contact with upper front side of rod clip shoulder 11. When tip-up 1 is in it's tripped vertical position, stop peg 10 comes in contact with lower front side of rod clip shoulder 12.

A non-corosive flag wire 13 is attached and extends from disc 7 and angled upwardly. The flag wire 13 is then V shaped 14 it temporarily supports the fishing line 22 when tip-up 1 is in its cocked horizontal position (FIG. 2). The left arm 15 of the V shaped line holder 14 acts as a stop for the sliding counter weight 18 when the tip-up 1 is in it's tripped vertical position (FIG. 3). The right arm 16 of the line holder 14 is angled at 17, making flag wire 13 extend parallel to fishing pole 2. The downward slope of 16 is necessary. At times a very sharp and heavy strike by a fish will snap the flag wire 13 assembly to an upright position and may rebound it back again to it's original cocked position. This is prevented since the slope of 16 allows the sliding weight 18 to be stopped by 15 below and closer to the center of gravity, or pivot pin 9 (FIG. 3.).

Flag wire 13 supports a sliding counter weight 18 made of a non-corosive metal with a hole through the center 19 larger in diameter than diameter of flag wire 13 permitting it to slide freely.

Flag wire 13 also supports a tension adjuster 20 made of rubber with a hole through the center the same size in diameter as flag wire 13. It is used as the rear stop for the sliding counter weight 18. It regulates and holds the distance from sliding counter weight 18 to the pivot pin 9, resulting in varied tension adjustments.

At the very end of the flag wire 13 a brightly colored plastic flag 21 is attached for visual signals.

FIG. 2. Illustrates tip-up 1 in a cocked position. When cocking tip-up 1 the flag wire 13 assembly riding on the pivot pin 9 is brought back in a clockwise direction until stip peg 10 comes in contact with upper front part of rod clip shoulder 11 preventing flag wire 13 assembly from any further clockwise movement. The sliding counter weight 18, that is butted against the tension adjuster 20 holds the flag wire 13 down, generally parallel to the fishing pole 2. The restraining fishing line 22 from the baited hook 24 to the reel spool 3 is temporarily suspended by the V shaped line holder 14 at approximately a 90° angle. This angle allows the reel to be left on free spool or open bait position 23. It is now seen that in this cocked position the pivot pin 9 acts as the fulcrum between the restrained V shaped line holder 14 and the sliding counter weight 18 producing a potential seesaw action which prevents false signals by absorbing wind, water and rod movement; not in character of a fish strike.

FIG. 3. Illustrates the tip-up in it's tripped position. When taking the baited hook 24, fish pulls on fishing line 22 causing the V shaped line holder 14 to be forced downward tilting flag wire 13 in a counter clockwise direction. The sliding counter weight 18 is seen to slip and fall forward, beyond the fulcrum resulting in the flag wire 13 flipping to a vertical strike indicating position and simultaneously releasing the fishing line 22. The fall of the sliding weight 18 is stopped by left arm 15 of the V shaped line holder 14. Flag wire 13 assembly will not pass the vertical because stop peg 10 comes in contact with lower part of rod clip shoulder 12 preventing any further counter-clockwise movement.

Tip-up has a novel method for tension adjustments that will now be explained in detail. When stronger tensions are required, the tension adjuster 20 and sliding counter weight 18 are moved back away from the pivot pin 9 (FIG. 1) creating more leverage against the restrained V shaped line holder 14, consequently, more pull on the fishing line 22 is required to force the V shaped line holder 14 downward activating the tip-up.

When less tension is desired, the tension adjuster 20 and sliding counter weight 18 are moved forward, toward the pivot pin 9 (FIG. 1) creating less leverage against the restrained V shaped line holder 14 resulting in less pull on fishing line 22 to activate tip-up.

This method of tension adjustments varies from very heavy to feather touch trips which most fishermen deem necessary when fishing for different species of fish.

As soon as the tip-up 1 has been activated by a striking fish, it is not necessary to slip off tip-up because it will not interfere with the play of the hooked fish. It also can stay attached to the fishing rod while casting.

It will be seen that an improved dual purpose fish tip-up and line control has been provided which combines these functions in a relatively simple and reliable construction. In addition to providing these improvements, the tip-up also resists false alarms by having a seesaw action which is activated only by a distinct pull on the restrained fishing line and which resists release by wind and water forces.

The fish tip-up, in accordance with the present invention, also includes a novel arrangement of the trigger means which permits it's immediate adjustments for different fishing conditions and with a visual signal.

As various changes may be made in form, construction and arrangement of the parts herein without departing from the spirit and scope of the invention and without sacrificing any of it's advantages, it is understood that all matter herein is to be interpreted as illustrative and not in a limiting sense.

Having thus described my invention, I claim:

1. A tip-up device for use on a fishing pole for signaling a fish strike and for releasing the fishing line comprising the combination of:
   an elongated signal member,
   means for releasably attaching the signal member to the fishing pole,
   means pivotally attaching one end of said signal member to said attaching means,
   means for releasably holding the fishing line on said signal member adjacent to the pivotal attachment for holding the fishing line when said rod member is turned generally parallel to the fishing pole and for turning the signal member and for releasing the fishing line when a fish strike turns the signal member to a position generally at right angles to the fishing pole, and
   a weight slidably contained on said signal member for movement between a hold-down position near the outer end of the signal member and a release position adjacent to said line holding means, and
   an adjustable stop member on said signal member for setting the outermost position of said weight.

2. The tip-up device as claimed in claim 1 which further comprises a flag on the outer end of said signal member.

3. The tip-up device as claimed in claim 1 in which the means for releasably attaching the tip-up to the fish pole comprises the spring clamp.

4. The tip-up device as claimed in claim 1 in which the means for releasably holding the fishing line comprises a projection positioned generally perpendicularly to said signal member.

5. The tip-up device as claimed in claim 1 in which the means for releasably holding the fishing line comprises generally a U-shaped integral projecting portion of said rod member.

* * * * *